J. Whiteford,
Brick Machine.

No. 95,962.            Patented Oct. 19, 1869.

Witnesses:
John R. Crooks
Geo. W. Mabee

Inventor:
J. Whiteford
per Munn & Co.
Attorneys

United States Patent Office.

JOHN WHITEFORD, OF POND CITY, KANSAS.

*Letters Patent No. 95,962, dated October 19, 1869; antedated October 9, 1869.*

IMPROVED BRICK-MACHINE.

The Schedule referred to in these Letters Patent and making part of the same.

*To all whom it may concern:*

Be it known that I, JOHN WHITEFORD, of Pond City, in the county of Wallace, and State of Kansas, have invented a new and improved Brick-Machine; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

My invention has for its object to furnish a simple, convenient, and effective machine for moulding brick, and distributing them through the yard; and It consists in the construction and combination of the various parts of the machine, as hereinafter more fully described.

A represents the frame of the machine, the rear end of which rests upon and is connected with the axle B of the wheels C.

Figure 1:
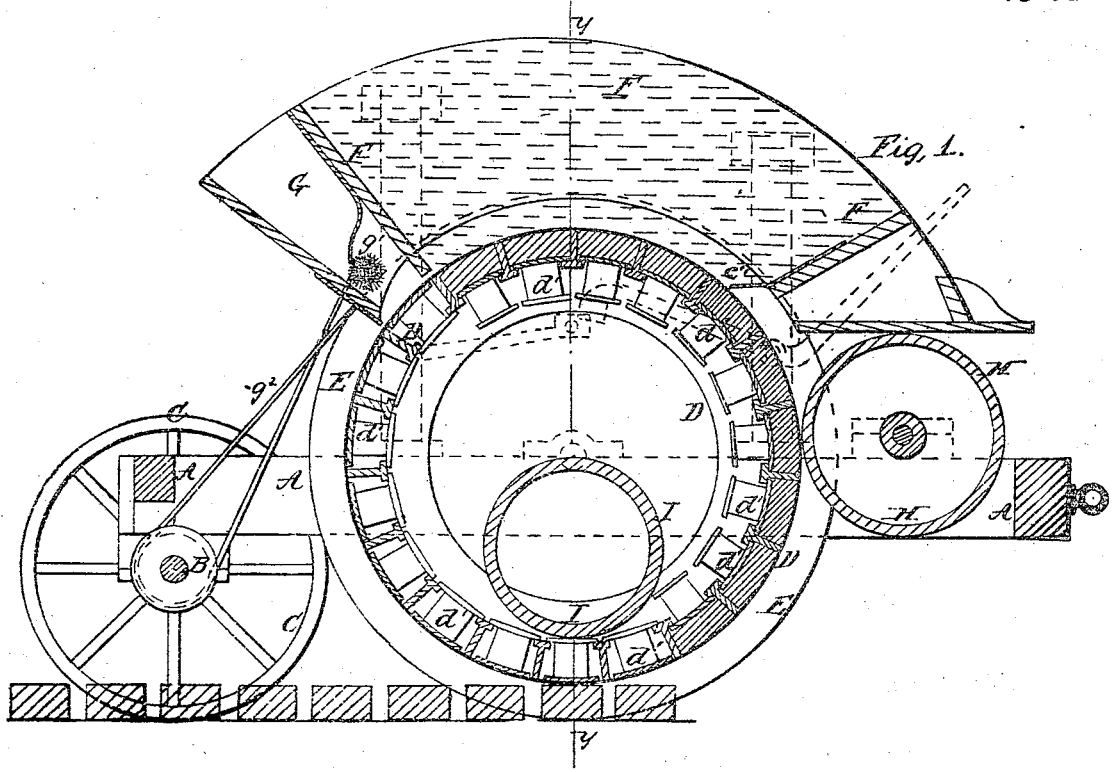
Figure 1 is a vertical longitudinal section of my improved machine, taken through the line $x\,x$, fig. 2.

D is the moulding-wheel or cylinder, the journals of which revolve in bearings in the frame A, and in the face of which are formed one or more rows of moulds, the bottoms $d'$ of which are movable, and rest upon flanges formed upon the inner edges of the sides of the moulds, as shown in fig. 1.

To the inner sides of the movable bottoms $d$ are attached short arms, having cross-heads or plates formed upon or attached to their inner ends, which strike against the inner edges of the sides of the moulds, and prevent the said movable bottoms $d'$ from dropping out.

E are two wheels, which revolve loosely upon the journals of the wheel or cylinder D, and one or both of which may be provided with clutches, catches, or other well-known device, by means of which they may be made to carry the moulding-cylinder D with them in their revolution, or not, as may be desired.

Figure 2:
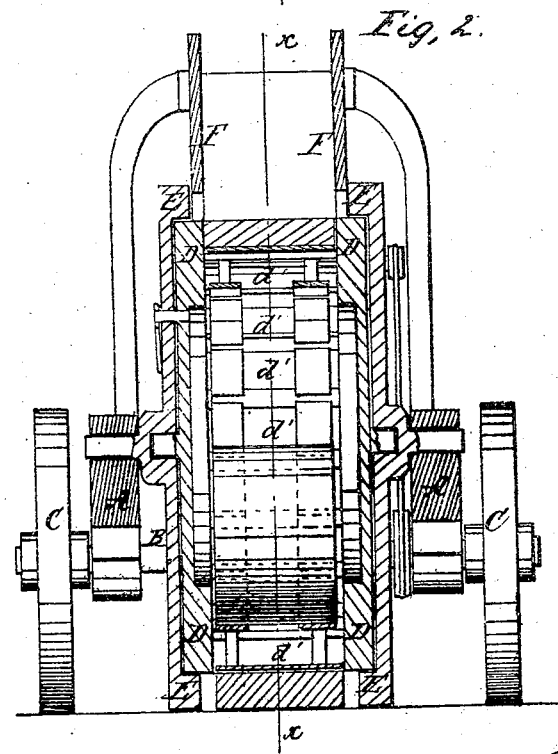
Figure 2 is a vertical cross-section of the same, taken through the line $y\,y$, fig. 1.

The wheels E are of a larger diameter than the cylinder D, so as to leave a sufficient space between the face of the cylinder D and the ground, to allow the bricks to be deposited upon the ground as the machine moves forward, as shown in red lines in figs. 1 and 2.

F is the hopper, in which the clay or mud is placed, from which the bricks are to be formed.

G is a sand-box, formed at the rear of the mud-hopper to receive the sand with which the moulds are sprinkled before they receive the clay.

The sand is sprinkled over the moulds by the brush $g^1$, which revolves in the bottom of the sand-box G.

The brush $g^1$ may be revolved by the band $g^2$ from the axle B, or by any other convenient means.

To the forward wall of the hopper F is attached a scraper, $e'$, by means of which the surplus clay is removed from the moulds as the filled moulds pass out of the hopper F.

H is a roller, the journals of which revolve in bearings in the frame A, in such positions that the roller H may press the clay or mud down into the moulds as they pass out of the hopper F.

I is a heavy roller, placed loosely in the interior of the mould-cylinder D, and which, as the machine is drawn forward, rolls along the inner surface of the rim of the cylinder D, and forcing the movable bottoms $d'$ of the moulds outward, forces the bricks out of said moulds upon the ground, as shown in figs. 1 and 2.

In the case of stiff clay, one or more rollers may be used, as desired or necessary.

In using the machine, the hopper F is filled with clay, the wheel or wheels E are thrown out of gear with the cylinder D, and the machine is drawn to the place where it is desired to deposit the moulded bricks.

The wheel or wheels E are then thrown into gear with the mould-cylinder D, so as to carry the said machine with them as the machine is drawn forward, depositing the moulded brick upon the ground.

Having thus described my invention,

What I claim as new, and desire to secure by Letters Patent, is—

The combination of the pressure-roller or rollers H, mould-cylinder D $d'$, interior loose roller I, and side-wheels E with each other and with the frame A and hopper F, said parts being constructed, arranged, and operated substantially as herein shown and described, and for the purposes set forth.

JOHN WHITEFORD.

Witnesses:
W. W. JONES,
A. C. SCHMEE.